(12) United States Patent
Rittiger

(10) Patent No.: US 8,305,777 B2
(45) Date of Patent: Nov. 6, 2012

(54) CONTROL DEVICE FOR RECTIFIER STATIONS IN A HIGH-VOLTAGE DC TRANSMISSION SYSTEM

(75) Inventor: Jürgen Rittiger, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 446 days.

(21) Appl. No.: 12/530,726

(22) PCT Filed: Mar. 19, 2007

(86) PCT No.: PCT/DE2007/000512

§ 371 (c)(1),
(2), (4) Date: Sep. 10, 2009

(87) PCT Pub. No.: WO2008/113307

PCT Pub. Date: Sep. 25, 2008

(65) Prior Publication Data

US 2010/0039841 A1    Feb. 18, 2010

(51) Int. Cl.
*H02J 3/36*    (2006.01)
(52) U.S. Cl. .......................... 363/35; 363/51
(58) Field of Classification Search .............. 363/35, 363/51, 85, 87, 88, 96, 128, 129, 135–138, 363/37, 54, 57–58; 307/82
See application file for complete search history.

(56) References Cited

U.S. PATENT DOCUMENTS

| 3,768,001 | A | * | 10/1973 | Thorborg | 363/71 |
| 3,992,659 | A | | 11/1976 | Ekstrom | |
| 4,146,920 | A | * | 3/1979 | Wills | 363/27 |
| 4,648,018 | A | * | 3/1987 | Neupauer | 363/35 |
| 5,187,651 | A | | 2/1993 | Ekstroem | |
| 5,701,239 | A | | 12/1997 | Björklund et al. | |

FOREIGN PATENT DOCUMENTS

| GB | 2295506 A | 5/1996 |
| JP | 8065896 A | 3/1996 |
| JP | 9511899 T | 11/1997 |
| JP | 2002291159 A | 10/2002 |
| RU | 2089986 C1 | 9/1997 |
| SU | 1283893 A1 | 1/1987 |
| WO | 9624978 A1 | 8/1996 |

OTHER PUBLICATIONS

Karlecik-Maier, et al: "Simulation von Hochspannungsgleichstromübertragung and Statischen Kompensatoren", XP-000225607, Elektrie, vol. 45 (1991) No. 3, pp. 100-103, Berlin, Germany and Statement of Relevance.
International Search Report dated Nov. 5, 2007.

* cited by examiner

*Primary Examiner* — Harry Behm
(74) *Attorney, Agent, or Firm* — Laurence A. Greenberg; Werner H. Stemer; Ralph E. Locher

(57) ABSTRACT

A control device for rectifier stations in a high-voltage DC transmission system has a rectifier drive unit and an inverter drive unit for driving power rectifier stations that are working either as a rectifier or as an inverter. The trigger angles for the rectifier or for the inverter can be adjusted and regulated by way of the rectifier drive unit and the inverter drive unit respectively. A delay element is placed between the rectifier drive unit and the inverter drive unit with which the start time for regulating the trigger angle for the inverter relative to the start time for regulating the trigger angle for the rectifier can be delayed by a predetermined delay time. Because of less mutual interaction of the trigger angle control processes, a relatively faster transition from an initial operating state into a new stationary state results.

3 Claims, 1 Drawing Sheet

CONTROL DEVICE FOR RECTIFIER STATIONS IN A HIGH-VOLTAGE DC TRANSMISSION SYSTEM

BACKGROUND OF THE INVENTION

Field of the Invention

The invention relates to a control device for converter stations in a high-voltage direct-current transmission device.

For high-voltage direct-current transmission, it is necessary for converter stations which operate as a rectifier or as an inverter depending on the current flow direction to be driven in a defined manner when the operating state of the high-voltage direct-current transmission device changes. With the modern conventional design of converter stations using thyristors, this is normally done by setting trigger angle regulators, which drive the converter stations, to previously calculated values which are defined to correspond to the new operating state. After simultaneous enabling of the trigger pulses at the converter stations, the trigger angle regulators are enabled at the same time, with the trigger angles then being set to the rated values, on the basis of the previously calculated values, via a control loop.

BRIEF SUMMARY OF THE INVENTION

The invention is based on the object of specifying a control device for converter stations in a high-voltage direct-current transmission device, by means of which a new steady-state operating state can be reached in a relatively short time starting from an initial operating state.

In the case of a control device for converter stations in a high-voltage direct-current transmission device, this object is achieved according to the invention by a rectifier drive unit for driving a converter station which operates as a rectifier and by an inverter drive unit for driving a further converter station which operates as an inverter, which each have a trigger angle regulator for setting and regulating trigger angles for the rectifier and the inverter, respectively, with a delay element being located between the rectifier drive unit and the inverter drive unit, by means of which a predetermined delay time can be enabled after the enabling of the trigger angle regulator of the rectifier drive unit for regulating the trigger angle of the rectifier and the trigger angle regulator of the inverter drive unit for regulating the trigger angle of the inverter.

Since, according to the invention, the trigger angle regulator for the inverter is enabled with a time delay after the trigger angle regulator for the rectifier, the trigger angle for the rectifier can first of all be regulated from a value previously calculated on the basis of the new operating state to a transitional value which is already relatively close to a subsequent, quasi-steady-state value, with this control process taking place without being influenced by processes at the inverter drive unit. Only when, after the delay time, the inverter drive unit for driving the inverter is connected for the trigger angle of the inverter on the basis of the initial previously calculated value does the corresponding control process at the inverter influence the rectifier drive unit, although this avoids relatively long-lasting equalization processes resulting from the control process having already been substantially completed there. Overall, this results in a relatively short time period for the transition of the high-voltage direct-current transmission device from the initial operating state to the further operating state.

Further expedient refinements of the invention are the subject matter of the dependent claims.

The invention will be explained in more detail in the following text using one exemplary embodiment and with reference to the figures of the drawing, in which:

DESCRIPTION OF THE INVENTION

Figure 1:
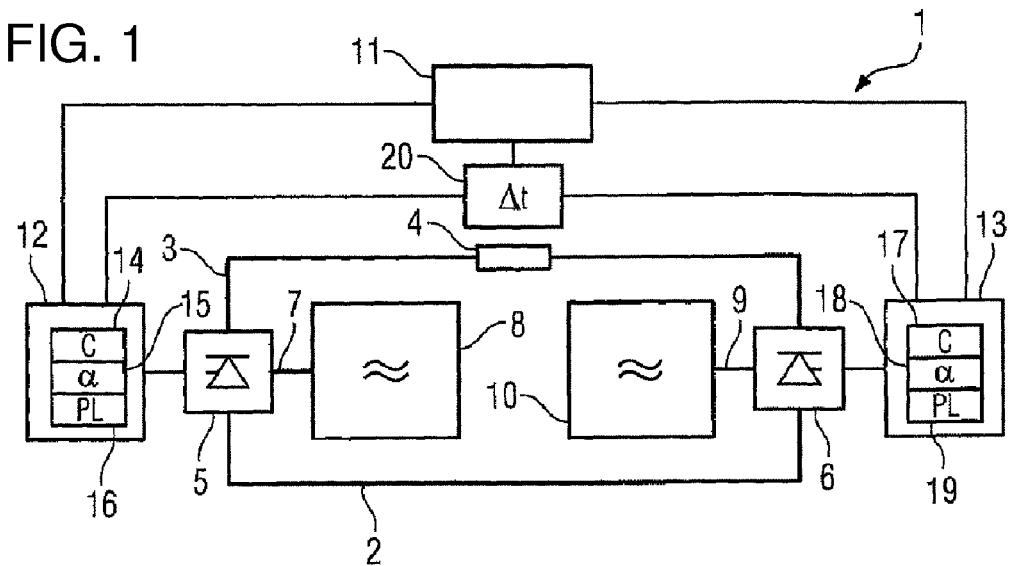
FIG. 1 shows a block diagram of a high-voltage direct-current transmission device having a control device for converter stations.

FIG. 1 shows a high-voltage direct-current transmission device 1 schematically, in the form of a block diagram. In this exemplary embodiment, the high-voltage direct-current transmission device 1 has a first direct-current line 2 and a second direct-current line 3, which are each represented by relatively thick lines, with a load 4 being shown symbolically in the second direct-current line 3, in order to represent the various losses which undoubtedly occur.

The direct-current lines 2, 3 are respectively connected to a thyristor-based rectifier 5, as a first converter station, and to a thyristor-based inverter 6, as a second converter station. The rectifier 5 couples the high-voltage direct-current transmission device 1 on the feed side via a first AC voltage line arrangement 7, which is shown as a thick line, to a first AC voltage system 8, while the inverter 6 couples the high-voltage direct-current transmission device 1 on the output side via a second AC voltage line arrangement 9, which is shown by a thick line, to a second AC voltage system 10, such that the AC voltage systems 8, 10 are connected to one another for transmission of power, in this case from the first AC voltage system 8 to the second AC voltage system 10.

Furthermore, as can be seen from FIG. 1, the high-voltage direct-current transmission device 1 has a central unit 11 and, as converter drive units, a rectifier drive unit 12, which is connected to the rectifier 5, and an inverter drive unit 13, which is connected to the inverter 6, with the lines for transmission of control signals being illustrated considerably thinner than the direct-current lines 2, 3 and the AC voltage line arrangements 7, 9 in FIG. 1, for clarity reasons.

The rectifier 5 can be driven, as will be explained in more detail further below, by the rectifier drive unit 12 via an enable module 14, a trigger angle transmitter 15 and a trigger angle regulator 16.

In a corresponding manner, the inverter drive unit 13 for driving the inverter 6 is likewise equipped with an enable module 17, a trigger angle transmitter 18 and a trigger angle regulator 19.

The trigger pulses for the rectifier 5 and the inverter 6 can be activated by the enable modules 14, 17. The trigger angle transmitters 15, 18 feed previously calculated trigger angles to the rectifier 5 and to the inverter 6 as a function of the initial operating state and of the new operating state to be assumed.

Typical changes of operating states are, for example, the transitions from a switched-off state to a minimum-power state, the sudden change from an initial nominal power to a new nominal power, or a change in the power direction, with the opposite power flow direction, and therefore a change in the functionalities of the converter stations.

Furthermore, the high-voltage direct-current transmission device 1 is equipped with a delay element 20 which, in this exemplary embodiment, can expediently be driven via the central unit 11, and is connected to the rectifier drive unit 12 and to the inverter drive unit 13. The delay element 20 makes it possible to enable the trigger angle regulator 19 of the inverter drive unit 13 for regulating the trigger angle for the inverter 6 when a predetermined delay time has elapsed after enabling of the trigger angle regulator 16 of the rectifier drive unit 12 for regulating the trigger angle for the rectifier 5.

In the steady operating state, there is a connection via the central unit 11 between the rectifier 5 and the inverter 6 in order, for example, to calculate the resistance, which is dependent on temperature fluctuations, in the direct-current lines 2, 3, which resistance is required for the advance calculation of the new steady-state trigger angles of the trigger angle regulators 16, 19.

Figure 2:
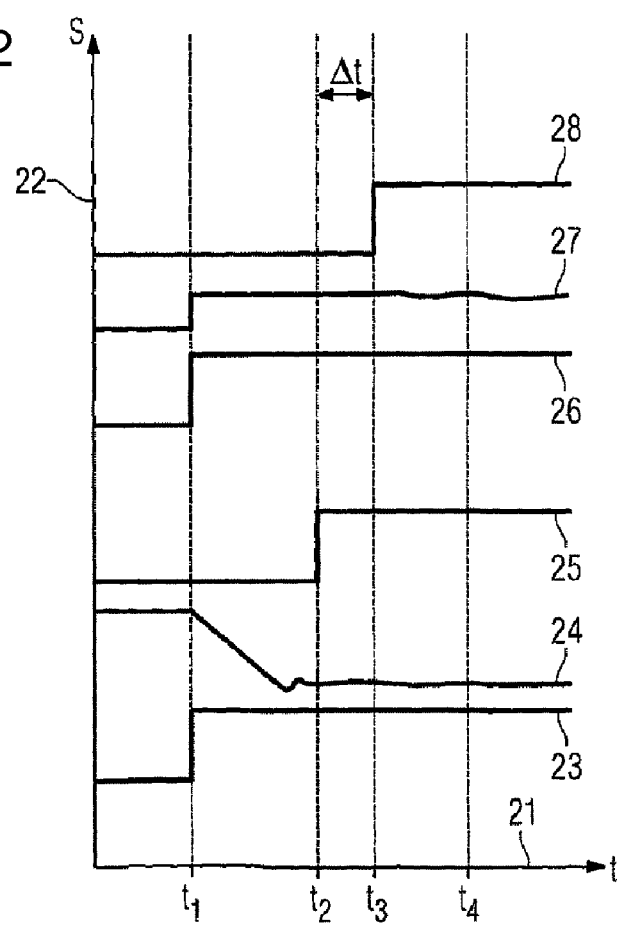
FIG. 2 shows an illustration of the signals for driving the various components of the rectifier drive unit and of the inverter drive unit.

As an example of a change to an operating state, FIG. 2 illustrates the transition from a switched-off state to an operating state with a predetermined rating, for example the minimum power, illustrated in the form of a graph of specific signal profiles for major components in the high-voltage direct-current transmission device 1 as explained in FIG. 1. The time t is plotted on a time axis 21 as the abscissa, with characteristic times $t_1$, $t_2$, $t_3$, $t_4$. Signal values S are plotted in arbitrary units along a signal axis 22 as the ordinate, which is at right angles to the time axis 21.

The lowermost signal profile in FIG. 2 shows the trigger pulse enable signal 23 from the enable module 14 of the rectifier drive unit 12. Until the time $t_1$, the trigger pulse enable signal 23 is blocked, so that the rectifier drive unit 12 does not emit any trigger pulses to the rectifier 5. At the time $t_1$, the trigger pulse enable signal 23 changes from the low level to a high level, where it then remains, and at which the rectifier drive unit 12 passes trigger pulses to the rectifier 5.

The signal profile located immediately above the trigger pulse enable signal 23 in FIG. 2 shows the trigger angle signal 24 from the trigger angle transmitter 15 of the rectifier drive unit 12. Until the time $t_1$, the trigger angle signal 24 is at a value which corresponds to a trigger angle of 90 degrees, while, from the time $t_1$ until a later time, it is changed to the previously calculated value for the trigger angle of the rectifier 5.

The signal profile located immediately above the trigger angle signal 24 in FIG. 2 shows the trigger angle regulator enable signal 25, by means of which the trigger angle regulator 16 of the rectifier drive unit 12 to regulate the trigger angle signal 24, at a time $t_2$ after characteristic parameters of the direct-current circuit come within regulator limits, as is shown in the illustration in FIG. 2 by the change in the trigger angle regulator enable signal 25 from a mid-level to a high level. In consequence, after the level change of the trigger angle regulator enable signal 25, the rectifier 5 is in a steady operating state, except for minor fluctuations in the trigger angle signal 24 resulting from the control process.

The signal profile which is located a certain distance above the trigger angle regulator enable signal 25 in FIG. 2 shows the trigger pulse enable signal 26 from the enable module 17 of the inverter drive unit 13. The trigger pulse enable signal 26 for the inverter 6 changes from a mid-level to a high level at the time $t_1$, corresponding to the trigger pulse enable signal 23 for the rectifier 5.

The signal profile shown immediately above the trigger pulse enable signal 26 for the inverter 6 in FIG. 2 shows the trigger angle signal 27 from the trigger angle transmitter 18 for the inverter drive unit 13. At the time $t_1$, the trigger angle signal 27 changes from an initial level to a previously calculated value at an appropriate level for initial driving of the inverter 6, which was calculated previously taking account of the operating characteristics of the high-voltage direct-current transmission device 1 in the new operating state.

The signal profile located immediately above the trigger angle signal 27 for the inverter 6 in FIG. 2 shows the trigger angle regulator enable signal 28 for enabling the trigger angle regulator 19 of the inverter drive unit 13, which changes at a time $t_3$ from a low level to a high level in order to enable the trigger angle regulator 19 for the inverter drive unit 13, such that, after the time $t_3$, the trigger angle regulator 19 for the inverter drive unit 13 regulates the trigger angle for the inverter 6. This delay time $\Delta t = t_3 - t_2$ is governed by the delay element 20.

At a specific time $t_4$, which occurs later than the time $t_3$, the high-voltage direct-current transmission device 1 is then in the new and also steady operating state.

Typically, the time period from the time $t_1$ to the time $t_4$ is about 250 milliseconds, while the change in the operating state, based on conventional technology, lasts for about 1 second.

It is self-evident that the approach according to the invention, specifically switching the trigger angle regulator enable signal 28 for the converter station which operates as an inverter 6 to enable a delay with respect to the trigger angle regulator enable signal 25 for the converter station which operates as a rectifier 5, with this delay being sufficient for the trigger angle signal 24 for the rectifier 5 to lead to a trigger angle which fluctuates only to a relatively minor extent within a predetermined lower regulator limit and a predetermined upper regulator limit, can be used appropriately in a corresponding manner for other changes in operation, for example for a change in the power flow direction.

The invention claimed is:

1. A control assembly for converter stations in a high-voltage direct-current transmission device, comprising:
    a rectifier drive unit for driving a converter station operative as a thyristor-based rectifier, said rectifier drive unit being connected to a first AC voltage system and having a trigger angle regulator for setting and regulating a trigger angle for the rectifier;
    an inverter drive unit for driving a further converter station operative as a thyristor-based inverter, said inverter drive unit being connected to a second AC voltage system and having a trigger angle regulator for setting and regulating a trigger angle for the inverter;
    direct-current lines connected between said thyristor-based rectifier converter station and said thyristor-based inverter converter station;
    a delay element connected between said rectifier drive unit and said inverter drive unit and configured to inject a predetermined delay time after enabling of said trigger angle regulator of said rectifier drive unit for regulating the trigger angle of said rectifier and said trigger angle regulator of said inverter drive unit for regulating the trigger angle of said inverter.

2. The control device according to claim 1, which comprises a central unit connecting the converter stations to one another.

3. The control device according to claim 2, wherein said delay element is connected to said central unit and driven via said central unit for varying the delay time.

* * * * *